May 3, 1932.                H. A. STRELOW                1,856,976
                            UNLOADING MACHINE
              Filed Aug. 2, 1929          3 Sheets-Sheet 1
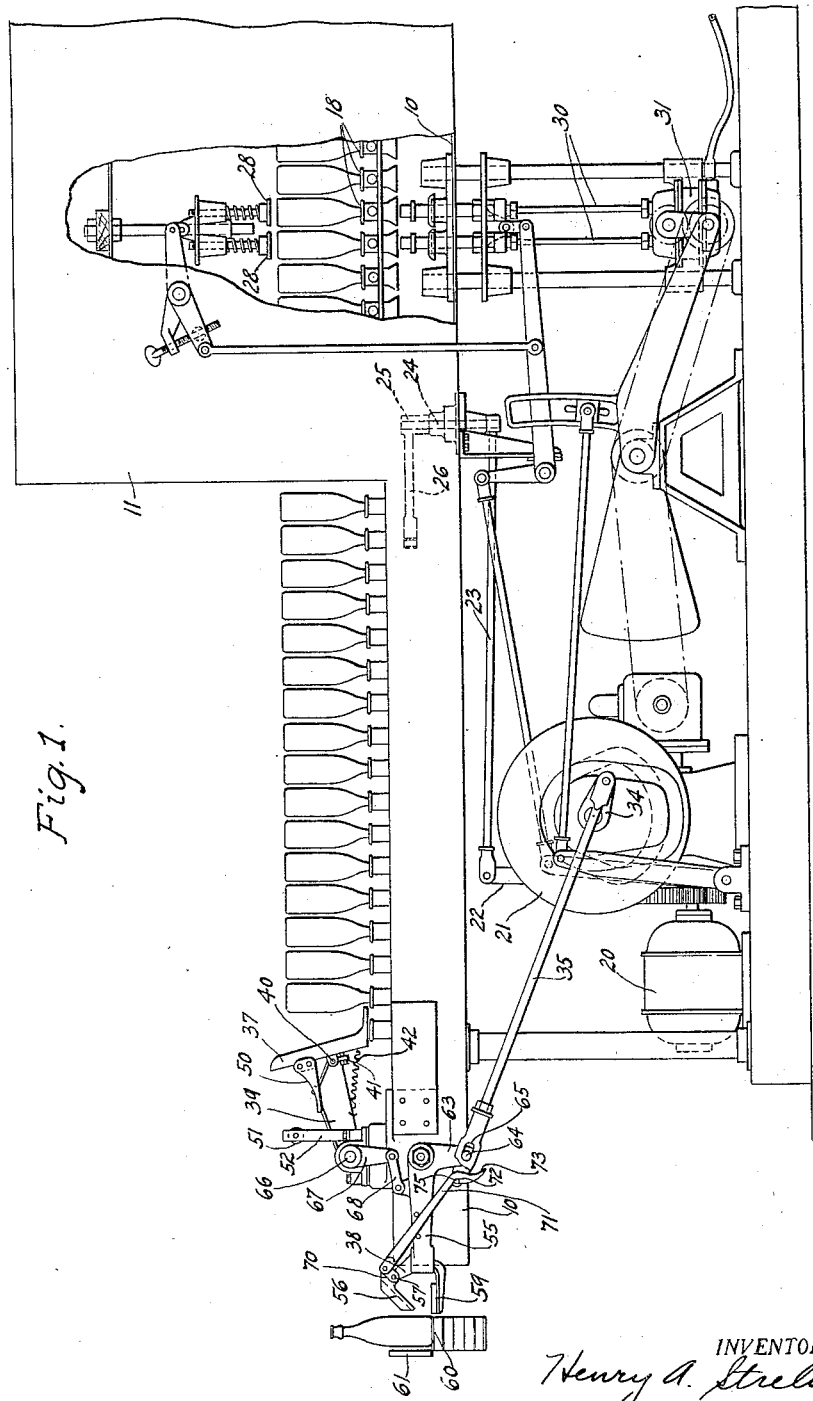
INVENTOR.
Henry A. Strelow
BY
Wheeler, Wheeler & Wheeler
ATTORNEYS May 3, 1932.    H. A. STRELOW    1,856,976
UNLOADING MACHINE
Filed Aug. 2, 1929    3 Sheets-Sheet 2
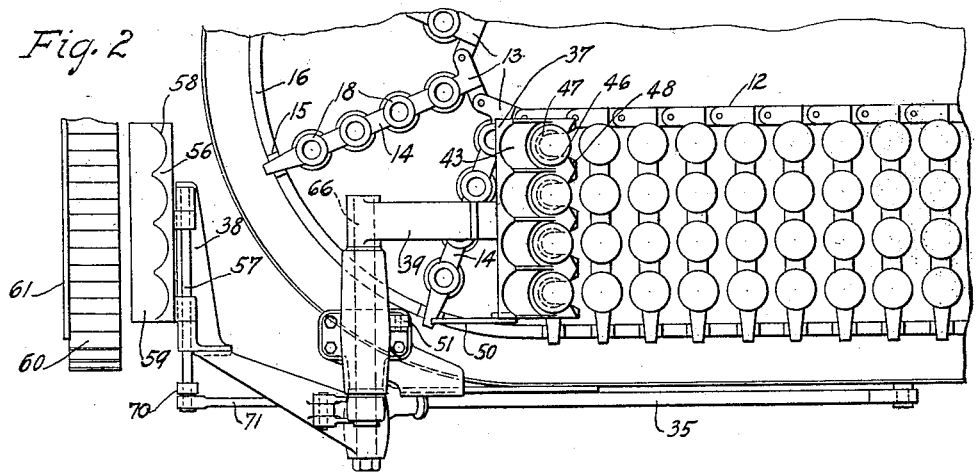
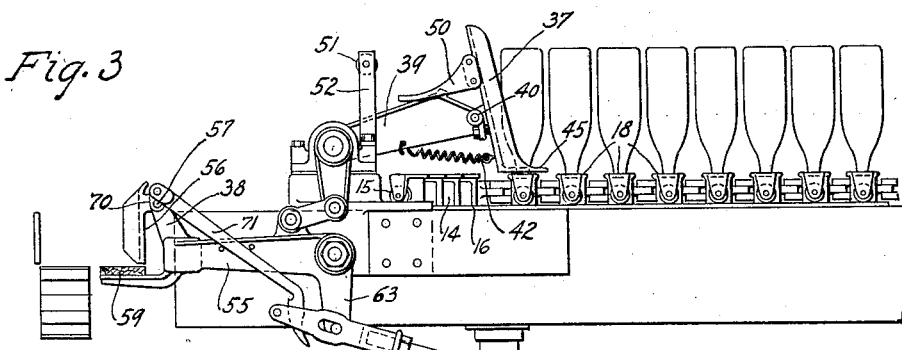
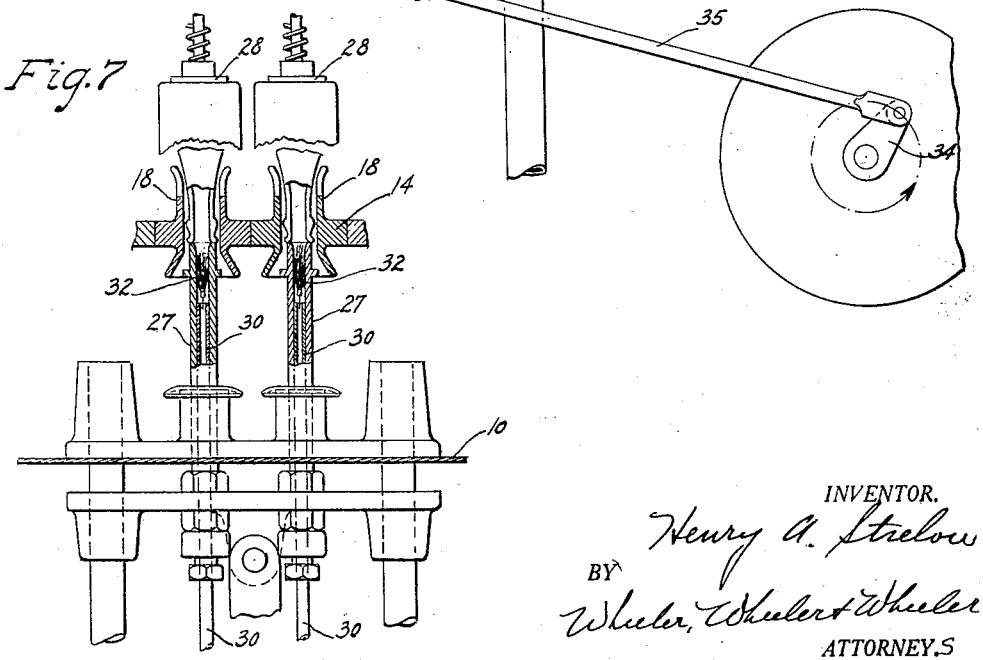
INVENTOR.
Henry A. Strelow
BY
Wheeler, Wheeler & Wheeler
ATTORNEYS May 3, 1932.  H. A. STRELOW  1,856,976
UNLOADING MACHINE
Filed Aug. 2, 1929   3 Sheets-Sheet 3
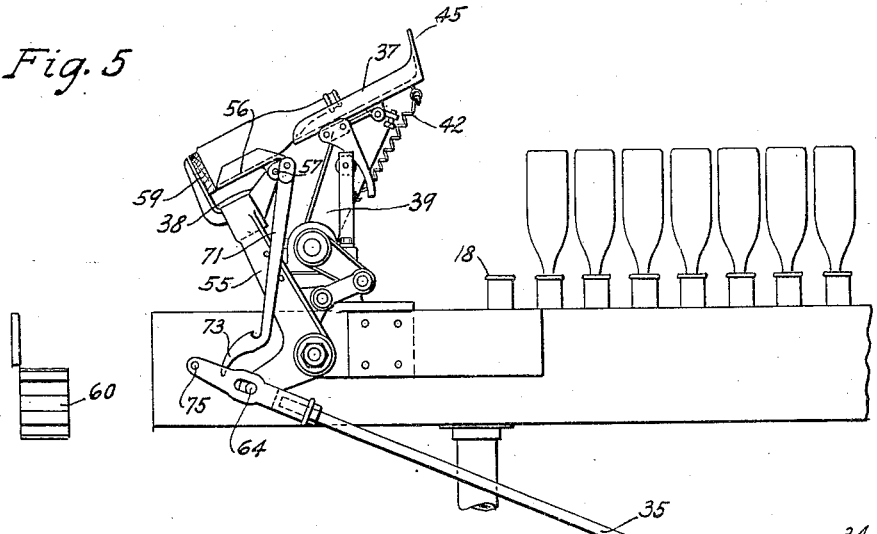
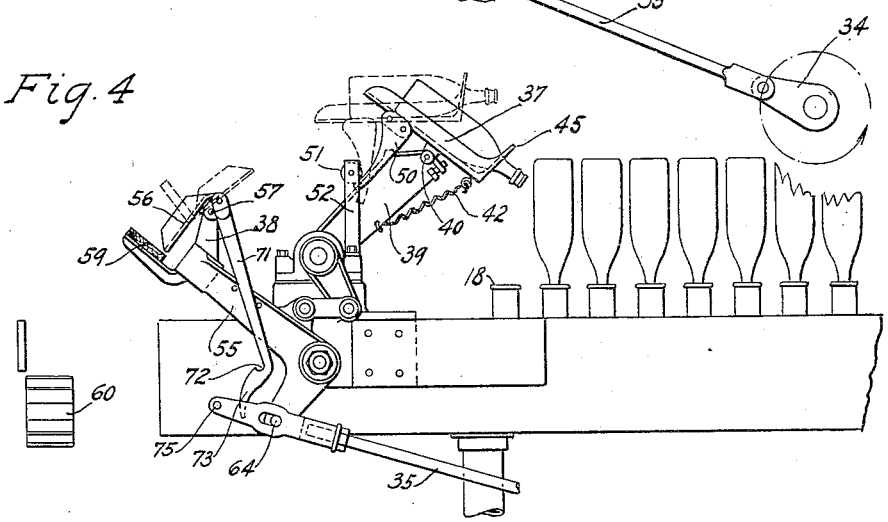
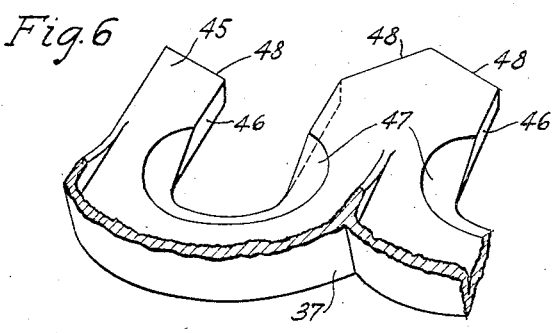
INVENTOR.
Henry A. Strelow
BY
Wheeler, Wheeler & Wheeler
ATTORNEYS Patented May 3, 1932

1,856,976

UNITED STATES PATENT OFFICE

HENRY A. STRELOW, OF MILWAUKEE, WISCONSIN, ASSIGNOR TO TWENTIETH CENTURY MACHINERY CO., OF MILWAUKEE, WISCONSIN, A CORPORATION OF WISCONSIN

UNLOADING MACHINE

Application filed August 2, 1929. Serial No. 382,866.

This invention relates to improvements in unloading machines for bottle or other receptacle washers.

It is the primary object of the invention to provide an unloading device suitable for glass bottles and the like which will lift such bottles from the supporting conveyor of the bottle washer, turn the bottles right side up and deliver them with a minimum of shock to a cross conveyor or other suitable support from which the bottles can be removed for boxing.

In order to provide mechanism for lifting and transporting the bottles without shock, I find it desirable to employ a carriage which conforms closely to the original vertical position of the bottle and which, in addition to its translative movement, has an oscillatory movement by which the bottle is adjusted toward its upright position. In order to complete the delivery of the bottle to the cross conveyor, I prefer to employ a separate carriage which receives the bottle by gravity from the first mentioned carriage, lowers it to an upright position and is provided with a separate member for ejecting the bottle from the second carriage on to the cross conveyor. The form of the carriages and particularly the form of the carriage which lifts the bottle from its place in the bottle washer conveyor is of considerable importance to the successful operation of the device.

In the drawings:

Figure 1 shows the delivery end of a bottle washing machine including a part of the bottle washing apparatus which is to comprise the subject matter of a separate application. The unloading mechanism is illustrated in side elevation in a position to receive bottles from the conveyor of the bottle washing machine and to discharge such bottles on to a suitable cross conveyor.

Figure 2 is a view in plan of the delivery end of the bottle washing machine and the bottle unloading device applied thereto.

Figure 3 is a side elevation of the parts shown in Figure 2 showing such parts in the position which they occupy when a row of bottles is initially picked up from the bottle washing conveyor.

Figure 4 is a detail in side elevation similar to Figure 3 but showing in full and dotted lines two successive positions of the parts during the elevation and partial turning movement of the bottle.

Figure 5 is a similar view illustrating the discharge of the bottle from the first to the second carriage.

Figure 6 is a fragmentary enlarged detail in perspective of the lower end of the bottle engaging portion of the lifting carriage, the upper portion of the carriage being broken away.

Figure 7 is a detail view illustrating a part of the bottle washing mechanism and showing, for the purpose of this invention, the extent to which the neck of the bottle is seated in the bottle washing conveyor from which bottles must be lifted by the delivery mechanism to which this invention relates.

Like parts are identified by the same reference characters throughout the several views.

The bottle washing machine to which this invention is applied as illustrated in the accompanying drawings consists, briefly, in an elongated pan or receptacle which is partially enclosed by a housing 11 and provides a guideway for a conveyor designated generically at 12 and comprising links 13 which traverse suitable guides at the ends of the machine. Each of the links carries an arm 14 supported by a roller 15 from a track 16 and provided with a series of tubular bottle supports or sockets 18 which are shown in detail in Figure 7. It is found that the form of socket 18 illustrated herein is adapted to receive a wide variety of bottle sizes and accordingly it is important to note that the unloading device hereinafter described is adapted to take bottles from the sockets 18 irrespective of the particular size or form of the bottle.

The bottle conveyor 12 has a step by step movement, being actuated from motor 20 through a cam disk 21, a cam follower lever 22, link 23, rock shaft 24, rocker arm 25 and link 26 to which a suitable pawl is connected as is usual in machines of this type.

During the dwell between periods of advance of the conveyor 12 bottles are washed within housing 11, being first lifted slightly from sockets 18 by tubular parts 27, lifted into abutment with the mouth of the bottle as shown in Figure 7, the inverted base of the bottle being simultaneously engaged from above by resiliently yieldable pressure plates 28 actuated from the same connections whereby tubes 27 are elevated. Synchronously the revolving tubular spindles 30, supplied with water from a chamber 31 and loosely carrying brushes 32, are thrust upwardly, together with chamber 31, whereby the brushes are caused to enter the bottles and to assist the water in cleansing the interior of the bottles. The connections for actuating these parts are clearly illustrated but need no further description herein.

During this same period of dwell in the course of which bottles are being washed the unloading device now to be described functions to remove washed bottles from all of the sockets 18 in one of the conveyor link arms 14, to elevate such bottles, turning them toward an erect position, to transport such bottles across the end portion of the conveyor, track or guideway, and to deposit such bottles right side up upon a delivery or cross conveyor or any other suitable support. Since the unloading device functions in synchronism with the bottle washing and conveying mechanism it is preferably driven from the same source through the medium of a crank 34 on the shaft carrying cam disk 21, and a connecting rod 35. The unloading device will now be specifically described.

The present unloader, as above indicated, comprises two separate carriages, generically designated by reference characters, 37 and 38. Carriage 37 receives the bottles from the conveyor in the course of conveyor movement. For this purpose carriage 37 is mounted on an oscillatory supporting arm 39 to which the carriage is fulcrumed at 40. The supporting arm may be provided with a stop 41 for holding the carriage 37 in an approximately upright position, as shown in Figure 1, the carriage being held to the stop by a tension spring 42.

The face of the carriage 37 is channeled at 43 as best shown in Figure 2, one channel being provided for each bottle. Obviously, the channels are made to register with the bottle receiving sockets 18 of the arms 14 of the conveyor 12.

Carriage 37 is provided with a foot at 45, this foot being illustrated in detail in Figure 6. The foot is relatively thin as shown in Figures 3, 4 and 5, its edge being notched at 46 to receive each of the several bottles for which the device is adapted. Surrounding the base of each notch 46 is a conically tapered bevel 47 which is adapted to center the neck portion of a bottle at the base of the notch and tends to prevent the egress of the bottle from a notch following its engaging therein. The portions of foot 45 at either side of notches 46 are cut away angularly as shown at 48, to facilitate their entry between bottles carried by the conveyor 12.

In the position of the parts shown in Figures 2 and 3, the support 39 is inclined sharply to the right and the carriage 37 is almost vertical with its pick up foot 45 just clearing the bottle sockets 18 of the conveyor. As shown in Figure 3 the last advance step of the conveyor has moved one row of bottles into the notches 46 of the pick up foot 45 so that when the support 39 oscillates counter-clockwise as viewed in Figure 3, the bottles in this row will be lifted from their sockets and will fall into the respective guide channels 43 of the carriage 37 as shown in Figure 4.

The annular bevel 47 in the pick up foot is adapted to permit of this slight tilting movement of the bottles as the necks of the bottles leave sockets 18, while at the same time any possible tendency of the bottles to slip from the grasp of the pick up foot is resisted.

As the support 39 continues its upward and counter-clockwise oscillation, a finger 50 mounted on carriage 37 engages an anti-friction roller 51 on the fixed stop member 52. The continued oscillation of the support 39 beyond the point at which this engagement is effected causes the oscillation of the carriage 37 upon its fulcrum at 40 against the tension of spring 42, whereby the bottle is pivotally adjusted during its bodily transportation toward the erect poistion which it ultimately assumes.

Simultaneously with the upward movement of carriage 37, carriage 38 is moving upwardly upon its support 55, which moves in a clockwise direction during this period.

As the parts pass the dotted line position in which they are illustrated in Figure 4, the supports 38 and 37 approach very closely together as shown in Figure 5. In this position the bottles carried by carriage 37 have passed the horizontal and tend to slide by gravity toward the left. In so sliding they pass from carriage 37 on to carriage 38 which includes an ejector plate 56 pivoted to the carriage 38 at 57 and preferably provided with channels 58 corresponding to the channels 43 of carriage 37. These channels appear clearly in Figure 2.

The bottles are stopped in their sliding movement by the base portion 59 of carriage 38 and the carriage now begins its return oscillation whereby it passes through the dotted line position in which it is illustrated in Figure 4 to the full line position, illustrated in Figure 4 and finally reaches its lowermost position in which it is shown in Figure 3. In this position the bottle is vertical and upright.

The actuating connections hereinafter to be described now causes the ejector 56 to oscillate about its pivotal connection at 57 to the position shown in Figure 1, thereby pushing the bottle from base portion 59 of carriage 38 on to any suitable support such as the cross conveyor 60, which is preferably backed with a stop board 61.

In the meantime carriage 37 has also been oscillating back to its original Figure 1 position, its initial movement being adapted to free finger 50 from the roller on stop 52 thereby permitting the carriage to oscillate about its fulcrum at 40 into engagement with the adjustable stop member at 41. Ultimately the carriage reaches its Figure 1 position and is at last in such position in readiness to receive bottles from the bottle washing conveyor when the ejector 56 is operating to discharge from carriage 38 the bottles already acted upon by the unloader.

The actuating connections will now be described. As above indicated they are worked out quite simply to be operated by a single connecting rod at 35 in synchronism with the step by step movement of the conveyor and the intermittent operation of the bottle washing mechanism.

The support 55 for carriage 38 is in the form of a bell crank having an arm 63 provided with a pin 64 engaged within a slot 65 at the end of link 35 to have a certain degree of lost motion with respect to such link.

The support 39 for carriage 37 is mounted on a rock shaft 66 having an arm 67 connected by link 68 with support 55 whereby the two supports are interconnected for simultaneous movement.

The ejector 56 is fulcrumed to carriage 38 upon a rock shaft 57 having an arm 70 to which the link 71 is pivoted. The extremity of this link has a hook at 72 with an arcuately extending point 73 substantially concentric to the pin 64 in bell crank 55. The end of this hook projects around a pin 75 in the end of the connecting rod or link 35, the arrangement being such that when the connecting rod 35 moves toward the left to take up the lost motion between slot 65 and pin 64, the pin 75 of the connecting rod will disengage itself from the hook 72, thus leaving the parts free for relative oscillation. During such oscillation the arcuately curved extremity of the hook will maintain a potential connection between the parts and serve as a guide for the re-establishment of hooking engagement when the parts are in their Figure 1 positions.

Commencing with the Figure 1 position of the parts in which the crank 34, from which connecting rod 35 is operated, is at its extreme right hand throw, it will be obvious that the ensuing rotation of crank 34 will cause connecting rod 35 to move to the left. The initial movement of the connecting rod in this direction will allow the ejector 56 to drop by gravity, drawing with it the link 71 to the full extent permitted by the initial movement of connecting rod 35.

This initial movement of connecting rod 35 causes no movement of the supports 39 and 55 due to the fact that pin 64 is free within slot 65.

As the rotation of crank 34 and the movement of connecting rod 35 continue the lost motion between pin 64 and the connecting rod is taken up and the connecting rod begins to push on the rod 63 on the bell crank 55 thereby lifting such bell crank and transmitting its movement through link 68 to oscillate the support 39.

The positions through which these parts pass in their oscillation have already been described. After the crank 34 crosses the dead center position in which it is illustrated in Figure 5 the connecting rod moves to the right allowing the gravity return of the two carriages to their lowered positions. Ultimately each of the two supports is about to rest by suitable stops and the lost motion between the connecting rod and pin 64 permits the connecting rod an added independent movement whereby its pin 64 engages hook 72 of the ejector link 71 to subject such link to tension and thereby actuate the ejector.

It will be noted that the simple mechanism herein described operates with little shock to bottles and serves to lift them from receptacles in which they are deeply engaged, to transfer them over the entire end portion of the bottle washing machine conveyor, to change their angular disposition during the period of transfer, and to discharge them erect without shock on to any adjacent support.

I claim:

1. In a device of the character described, the combination with a carriage and an oscillatory support therefor, of acutating connections for said support including lost motion linkage, an ejector operatively associated with said carriage for the discharge of articles therefrom and means connecting said ejector with a portion of said linkage for actuation thereby following the cessation of movement of said support.

2. In a device of the character described, the combination with a lever provided with a carriage device on one of its arms and a pin upon the other, a connecting rod provided with a slot engaged with said pin, whereby to provide for lost motion at the extremes of movement of said support, an ejecting mechanism associated with said carriage and a link operatively connecting said ejecting mechanism with said connecting rod, whereby to enable said mechanism to partake of the independent movement of said rod permitted by said slot.

3. In a device of the character described, the combination with a lever provided with a carriage device on one of its arms and a pin upon the other, a connecting rod provided with a slot engaged with said pin, whereby to provide for lost motion at the extremes of movement of said support, an ejecting mechanism associated with said carriage and a link operatively connecting said ejecting mechanism with said connecting rod, whereby to enable said mechanism to partake of the independent movement of said rod permitted by said slot, said link being provided with a hook having an arcuate extension serving as a guide with reference to a suitable pin carried by said rod.

4. In a device of the character described, a carriage comprising a support having a channeled member adapted to guide the side of a bottle and a notched foot disposed at an obtuse angle to said channeled member and provided with a notch so disposed as to engage the neck portion of a bottle registering with the channel of said member, said foot being annularly beveled about the base of the notch, whereby to retain in said notch the neck of a bottle lifted by said foot.

5. An unloading device adapted to handle bottles without material impact, said device comprising a first carriage provided with bottle-engaging means affording vertical support to a bottle engaged thereby and a rest providing lateral support for such bottle, an oscillatory member to which said carriage is pivoted and with which it is adapted to move bodily in a bottle-lifting direction, a second carriage adapted to receive bottles from the first carriage and provided with means for the lateral and vertical support of such bottles, a second oscillatory member upon which said second carriage is mounted, means for synchronously operating said members in opposite directions through an arc adapted to invert a bottle while vertically and laterally supported, and means for tilting the first carriage upon its supporting member for the discharge of a bottle therefrom on to the second carriage.

6. An unloading device adapted to handle bottles without material impact, said device comprising a first carriage provided with bottle-engaging means affording vertical support to a bottle engaged thereby and a rest providing lateral support for such bottle, an oscillatory member to which said carriage is pivoted and with which it is adapted to move bodily in a bottle-lifting direction, a second carriage adapted to receive bottles from the first carriage and provided with means for the lateral and vertical support of such bottles, a second oscillatory member from which said second carriage is mounted, means for synchronously operating said members in opposite directions through an arc adapted to invert a bottle while vertically and laterally supported, and means for tilting the first carriage upon its supporting member for the discharge of a bottle therefrom on to the second carriage, together with mechanism for mechanically ejecting the bottle from the second carriage while supported thereby in an upright position.

HENRY A. STRELOW.